May 19, 1959 R. E. HAMMOND ET AL 2,887,527

COMMUNICATION SYSTEM

Filed May 24, 1957 2 Sheets-Sheet 1

INVENTORS
RUSSELL E. HAMMOND &
KARL GEDULDIG
BY Charles H. Brown
ATTORNEY

May 19, 1959

R. E. HAMMOND ET AL 2,887,527

COMMUNICATION SYSTEM

Filed May 24, 1957

2 Sheets-Sheet 2

INVENTORS
RUSSELL E. HAMMOND &
KARL GEDULDIG
BY Charles H. Brown
ATTORNEY 2,887,527

COMMUNICATION SYSTEM

Russell E. Hammond, Bayside, N.Y., and Karl Geduldig, Darmstadt-Eberstadt, Germany, assignors of one-half to Radio Corporation of America, a corporation of Delaware, and one-half to Telefonbau und Normalzeit G.m.b.H., Frankfurt am Main, Germany Application May 24, 1957, Serial No. 661,389

7 Claims. (Cl. 178—2)

Figure 1:
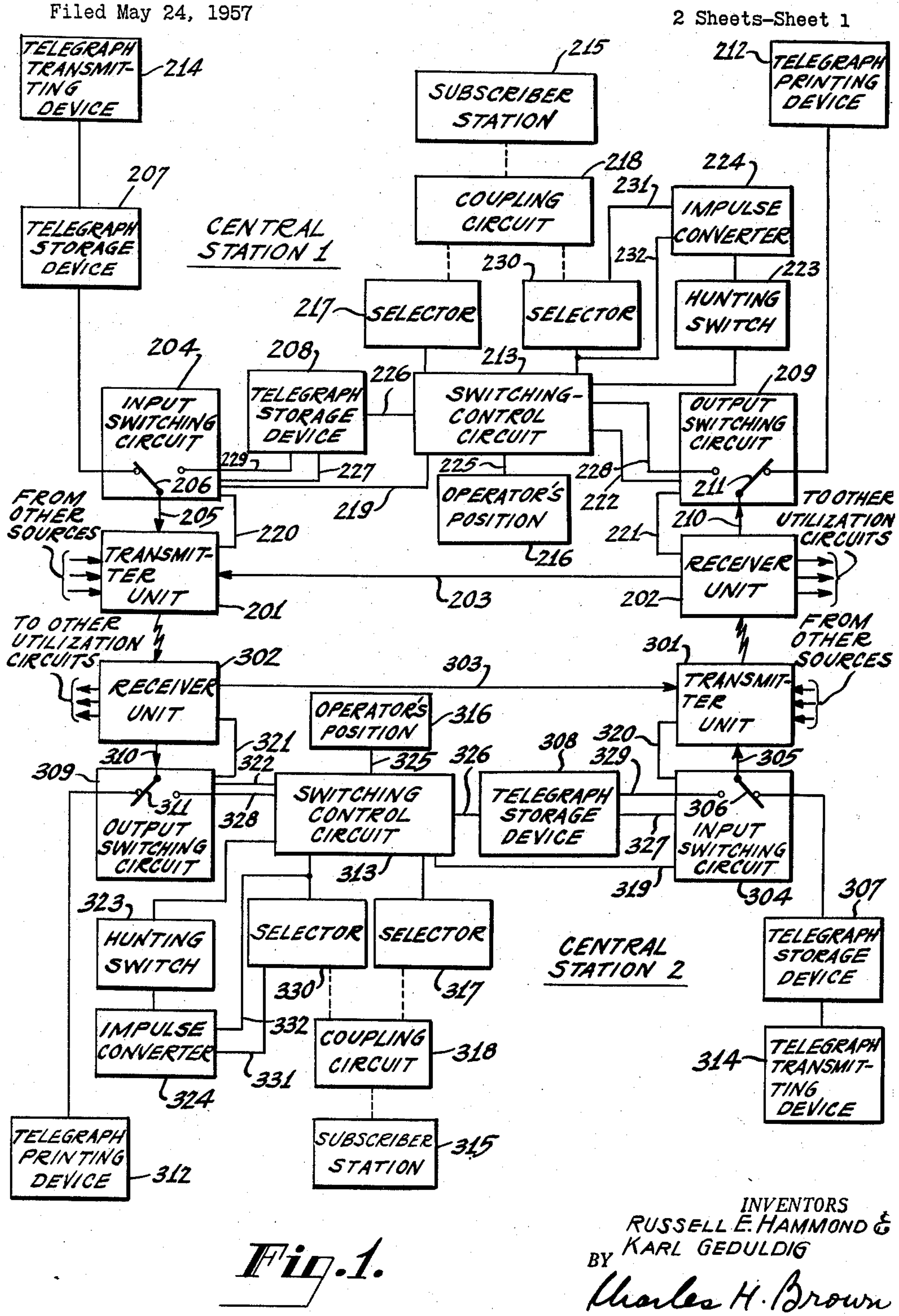

The invention relates to communication systems and particularly to a communication system in which the transmission paths available for the transmission of message signals can be automatically and more effectively adapted for use in different types of transmission systems.

A communication system generally includes at least a pair of central stations or offices. Each of the central stations services a different group of subscriber or customer stations to which it is connected. Two transmission paths are usually provided between the central stations. One of the transmission paths is arranged to carry message signals in one direction, while the other transmission path is arranged to carry message signals in the opposite direction between the central stations. In practice, the available transmission paths may be used in either one of two possible transmission systems. In one system, the transmission paths may each be operated on an individual or independent basis to complete the transmission of nonconversational or one-way message signals in the form of telegrams and similar traffic in the desired direction between the central stations at which are located transmitting and receiving telegraph equipment such as printers. Because the transmission paths are operated independently of one another, the transmission paths can be operated simultaneously, alternately, or in any manner desired to carry message signals in the different directions between the central stations. In a second transmission system, both transmission paths may be used to complete the transmission in the different directions of conversational or two-way message signals, such as teleprinter signals, between a subscriber station connected to one of the central stations and a subscriber station connected to the other central station. Since the number of transmission paths is limited, it is desirable to make the available transmission paths as versatile in operation as possible.

In known communication systems, the switching of the transmission paths from one-way to two-way operation first requires agreement to take this action by operating personnel at the respective central stations. The actual switching is performed by conventional, manually operated equipment. During the periods in which the two transmission paths are assigned to two-way operation, the subscriber stations, which are operatively connected together by the two-way transmission system, are operated alternately or, in other words, in a conversational manner. A message signal is sent by one of the subscriber stations over the proper one of the transmission paths to the other subscriber station. Thereafter, the other subscriber station sends an answering message signal to the first subscriber station over the other transmission path. By this action, cnly one of the transmission paths is used at any given time in a conversational two-way transmission system. While a message signal is being carried in a given direction over one of the transmission paths between the subscriber stations, the other transmission path remains idle and, therefore, represents wasted capacity time. This wasted capacity time can mean a loss of otherwise collectable revenue to a communication company and decreases the operating efficiency of the communication system.

It is an object of the invention to provide an improved communication system of the type in which the transmission paths extending between central stations and available for the transmission of message signals can be arranged for use in either a one-way or a two-way transmission system.

Another object is to provide a novel arrangement by which the transmission paths included in a communication system and available for the transmission of message signals can be automatically and more efficiently adapted for use either in a one-way or in a two-way transmission system.

In accordance with the invention, an automatically operated switching arrangement functions to make one of the two transmission paths in a communication system available for use as a one-way transmission system between printers at remotely located central stations while the other transmission path is being used for communication between subscriber stations connected to the different central stations. When a subscriber station located at one end of the communication system desires to converse with another subscriber station located at the other end of the communication system, a first one of the transmission paths arranged to carry message signals in the proper direction is automatically switched from the one-way transmission system in which it is normally used between printers located at the central stations and is made available to carry the message signal between the respective subscriber stations through the central stations. The other or second transmission path is maintained in the one-way transmission system in which it is normally used between printers located at the central stations. When the calling subscriber station completes the message signal and the called subscriber station wishes to send an answering message signal, the second transmission path is then switched from the one-way transmission system employing transmitting and receiving printer apparatus at both central stations, and is made available to carry the answering message signal between the respective remotely located subscriber stations through the central stations. After the connection over the second transmission path is established, the first transmission path which would otherwise assume and remain in an idle operating condition is then automatically switched back to its normal operating condition in which it is used in a one-way transmission system completed between the respective central stations and the transmitting and receiving printing apparatus at these central stations.

Instead of remaining idle, the first transmission path can be used for the transmission of one-way traffic between the central stations during the period in which it is not needed to complete the transmission of message signals between the subscriber stations. In this manner, the transmission paths normally remain available for the transmission of one-way or non-conversational traffic between the central stations. A transmission path between central stations is switched over for use in a two-way or conversational transmission system completed between remote subscriber stations only during the period in which a message signal is actually forwarded over the transmission path between the subscriber stations. A transmission path is not, therefore, maintained in an idle operating condition when a two-way transmission system is used, thereby greatly increasing the operating efficiency of the overall communication system. The switching actions described are performed automatically so that agreement between operating personnel at the respective central stations is unnecessary. The problems encountered in attempting to coordinate manual switching operations at the respective central stations are avoided.

A more efficient communication system is realized by the use of the invention. In the hitherto known systems, the transmission paths are both simultaneously made available to carry message signals when a two-way transmission system is established between a pair of subscriber stations. One of the transmission paths is held in an idle or free operating condition during the periods in which message signals are forwarded over the other transmission path. By means of the present invention, however, a more effective utilization of the transmission paths is provided because the transmission path not actually needed to carry message signals between subscriber stations in a two-way transmission system is maintained in its normal operating condition in which one-way traffic or message signals is carried in the corresponding direction between the central stations. The availability of a transmission path for carrying a message signal between remote subscriber stations in a two-way transmission system is limited to those periods in which a message signal is actually transmitted between the subscriber stations over the transmission path.

The invention is particularly suitable for use in a communication system of the type using the code characters of a fixed-length protected telegraph code. In a fixed-length protected telegraph code, a certain number of the signal elements included in each code character are of one nature, while the remaining signal elements included in the code character are of another nature. Each code character includes a predetermined ratio of the signal elements of one nature to the signal elements of the other nature. A received code character including a different ratio of the signal elements of one nature to the signal elements of the other nature is detected as an erroneous or mutilated code character. Control equipment is provided for causing the necessary correction procedures to be followed when such an erroneous character is detected. For example, in the seven-unit, fixed-length protected telegraph code, each code character includes a ratio of three marking elements to four spacing elements. Thirty-five different code characters each including a ratio of three marking elements to four spacing elements are possible. Since the alphabet commonly used in the transmission of message signals only includes thirty-two characters, three combinations of marking and spacing elements or code characters remain available. The available code characters are used according to the invention to control the switching of the transmission paths at the respective central stations. One of the code characters is used to switch a transmission path from use in a one-way transmission system completed between the central stations to the use thereof in a two-way transmission system completed between subscriber stations through the central stations. A second one of the code characters is used to switch the transmission path back to its normal operating condition in a one-way transmission system.

Figure 2:
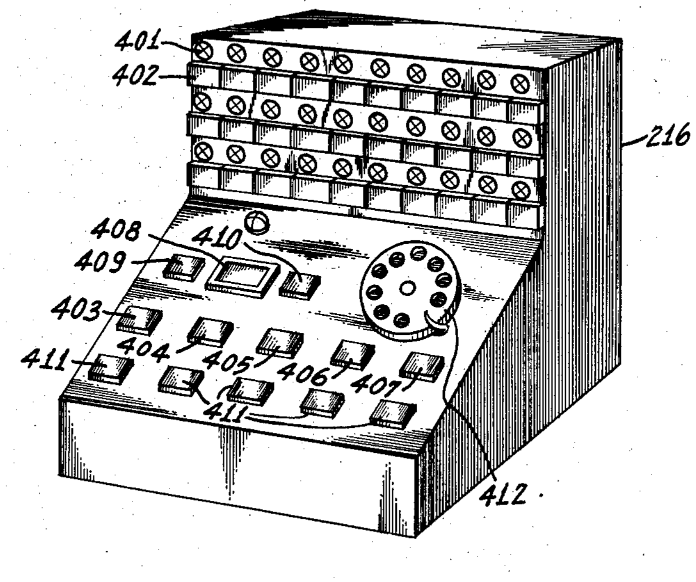

A more detailed description of the invention follows with reference to the accompanying drawing in which:

Figure 1 is a block diagram of a communication system constructed according to the invention; and Figure 2 is a physical view of an operator's position included in the arrangement of the block diagram given in Figure 1.

Referring to Figure 1, there is shown a communication system including a pair of central stations or offices 1, 2. The same reference numerals are used to identify corresponding equipment located at the respective central stations 1, 2. For ease of description, the reference numerals identifying equipment at the first central station 1 are each preceded by the number 2. The reference numerals identifying the equipment at the second central station 2 are each preceded by the number 3.

A first transmission path including a radio transmitter unit 201 and a radio receiver unit 302 is provided for forwarding message signals or traffic in one direction, as indicated, between the central stations 1, 2. A second transmission path including a radio transmitter unit 301 and a radio receiver unit 202 is also provided for forwarding message signals or traffic in the opposite direction, as indicated, between the central stations 1, 2. The transmitter units 201, 301 are preferably arranged for multiplex operation. Each of the transmitter units 201, 301 is connected to a number of suitable sources of message signals. While the transmitter units 201, 301 are each shown as connected over separate channels to four such sources of message signals, the number of sources to which each of the transmitter units 201, 301 is connected will depend upon the requirements of a particular application. The transmitter units 201, 301 each operate in response to the plurality of message signals applied from the different sources connected thereto to produce a composite, multiplex output signal for transmission to the corresponding one of the receiver units 302, 202.

The signal sources connected to the transmitter units 201, 301 over the separate channels are each arranged to produce message signals including a series of code characters of a telegraph code. It will be assumed that the message signals so produced include code characters of the five-unit, fixed-length telegraph code. As each code character is made available for transmission from one of the sources over a channel, it is stored in a telegraph storage device included in the channel. The storage device may, for example, be the type which stores the code characters as an arrangement of holes or perforations punched in a tape, the storage device including equipment for sensing the perforations in the tape and for forwarding the code characters to a transmitter unit 201 or 301 on demand. Such storage devices are known in the art by the designation FRXD.

The storage devices are operated to supply the code characters stored therein in response to control pulses applied thereto from the respective transmitter units 201, 301. As each code character is transmitted by one of the transmitter units 201 and 301, equipment is included in the transmitter unit for applying a control pulse to the proper storage device connected thereto over one of the channels to cause that storage device to supply the next code character stored therein to the transmitter unit. By the selective application of the control pulse produced by one of the transmitter units to the different storage devices included in the channels connected thereto, the storage devices are operated in succession and in a given order to supply code characters to the transmitter unit. In this manner each of the transmitter units 201, 301 operates in multiplex fashion to combine the message signals supplied over the various channels connected thereto to produce a single output signal for transmission to the corresponding one of the receiver units 302, 202.

The communication system, as shown in Figure 1, includes an automatic request and repetition system which functions to automatically correct by repeat transmission mutilated or distorted code characters received over the transmission paths. Such automatic code character correction systems are known in the art and depend for their operation on the use of a protected telegraph code. A protected telegraph code commonly used in such automatic code character correction systems is the seven-unit, fixed length telegraph code. Each code character in the latter code includes three elements of one nature and four elements of another nature. Each of the transmitter units 201, 301 includes code converting equipment, many examples of which are known, for converting the five-unit, start-stop code characters received into the corresponding code characters of the seven-unit telegraph code. The code characters available for transmission are in this manner transmitted as seven-unit code characters over the four channels included in the single multiplex output signal produced by the transmitter units 201, 301.

The receiver units 202, 302 are arranged to receive the multiplex signals transmitted thereto and each include code converting equipment for converting the seven-unit code characters received into the corresponding five-unit start-stop code characters. Error detecting equipment is also provided for determining the ratio of the signal elements of one nature to the signal elements of another nature in each code character. If a code character is detected as including other than the proper ratio of three elements of one nature to four elements of the other nature, the code character is determined to be a mutilated or erroneous code character. The five-unit code characters resulting from the conversion of correctly received seven-unit code characters are distributed by the respective receiver units 302, 202 in the proper manner to the four utilization circuits connected thereto. When a mutilated code character is received by the receiver unit 302 over one of the channels included in the multiplex signal, the receiver unit 302 prevents the distribution of further code characters received over that channel to the utilization circuit to which the code characters would otherwise be sent. At the same time a control signal is fed from the receiver unit 302 to the transmitter unit 301 over a lead 303.

The transmitter units 201, 301 include equipment for storing on a continuous basis a given number of the last code characters, for example, the last three code characters, transmitted thereby over each of the four channels included in the multiplex output signals. The transmitter unit 301 operates in response to the control signal received over lead 303 to halt the transmission of regular code characters from one of the sources connected thereto by not supplying control pulses to the corresponding storage device. The transmitter unit 301 then proceeds to transmit instead over the corresponding one of the four channels of the multiplex output signal a predetermined code character of the seven-unit telegraph code plus the last three code characters transmitted over that channel and stored in the transmitter unit 301. This predetermined code character is known in the art as Signal I.

The receiver unit 202 detects the reception of the code character Signal I and prevents the distribution of the repeated code characters to the particular utilization circuit to which the code characters received over the channel concerned are normally sent. A control signal is produced and forwarded from the receiver unit 202 to the transmitter unit 201 over a lead 203. Thereafter, the transmitter unit 301 and the receiver unit 202 return to normal operation. The transmitter unit 201 operates in response to the control signal received over lead 203 to halt the transmission of regular code characters over the channel in the multiplex output signal which carried the code character received mutilated by receiver unit 302 by not supplying control pulses to the corresponding storage device. The transmitter unit 201 then proceeds to transmit the code character Signal I and the last three code characters, including the code character received mutilated, transmitted over the channel and stored in the transmitter unit 201. If the code character originally received mutilated is now received correctly, the transmitter unit 201 and receiver unit 302 return to normal operation. If the code character is again received distorted, the above operations are repeated until the code character is correctly received. While the operation of the automatic correction system has been described in connection with the reception of a mutilated code character by the receiver unit 302, the operation thereof in the reverse direction when a code character is received mutilated by the receiver unit 202 is the same.

From the above description, it may be seen that the transmitter units 201, 301 and the receiver units 202, 302 form a multiplex communication system of a type known in the art. In the use of the five-unit telegraph code, it is possible to form thirty-two different code characters. In the use of the seven-unit telegraph code, it is possible to form thirty-five different code characters. This means that there are available at the transmitter units 201, 301 three code characters of the seven-unit telegraph code in addition to the thirty-two code characters required in the conversion of the five-unit code characters received into the corresponding code character of the seven-unit telegraph code. One of the three available code characters is used by each of the transmitter units 201, 301 as the code character Signal I referred to above. The remaining two code characters are designated as Alpha and Beta and are used according to the invention in a manner to be described. In describing the invention, reference will be made only to the arrangement of the equipment connected to a single one of the four channels over which message signals are forwarded between the transmitter unit 201 and the receiver unit 302 and to a single one of the four channels over which message signals are forwarded between the transmitter unit 301 and the receiver unit 202. However, it is to be understood that similar arrangements of equipment may be connected to the remaining channels.

According to the invention, the transmitter unit 201 is connected to an input switching circuit 204 over a channel 205. The input switching circuit 204 functions in a manner indicated by a switch 206 to connect the transmitter unit 201 to either a telegraph storage device 207 or to a telegraph storage device 208. The storage devices 207, 208 are necessary to store code characters applied thereto from suitable transmitting equipment until the transmitter unit 201 is ready to include the code characters in the multiplex output signal produced thereby. As mentioned, the storage devices may be of the type known in the art by the designation FRXD. In much the same manner, the transmitting unit 301 is connected to an input switching circuit 304 over a channel 305. The input switching circuit 304 functions in the manner indicated by the switch 306 to connect the transmitter unit 301 to either the telegraph storage device 308 or to the telegraph storage device 307.

The receiver unit 302 is connected to an output switching circuit 309 over a channel 310. The output switching circuit 309 functions in the manner indicated by the switch 311 to connect the receiver unit 302 to either a telegraph printing device 312 or to a switching-control circuit 313. In a similar manner, the receiver unit 202 is connected to the output switching circuit 209 over the channel 210. The output switching circuit 209 functions as indicated by the switch 211 to connect the receiver unit 202 to either a telegraph printing device 212 or to a switching-control circuit 213.

In normal operation, the switches 206, 211, 311 and 306 are in the positions shown in Figure 1. In this condition, message signals including code characters of the five-unit telegraph code originating at the telegraph transmitting device 214 are first stored in the telegraph storage device 207. The code characters are, thereafter, fed on demand from the telegraph storage device 207 to the transmitter unit 201 over the circuit including the switch 206 and channel 205. The transmitter unit 201 proceeds to convert the five-unit code characters into the corresponding code characters of the seven-unit telegraph code. The seven-unit code characters transmitted by the transmitter unit 201 are received by the receiver unit 302. The receiver unit 302 functions to convert the seven-unit code character received into the corresponding code characters of the five-unit telegraph code. If the seven-unit code characters are correctly received, the resulting five-unit code characters are, thereafter, fed to the telegraph printing device 312 over the circuit including switch 311 and channel 310.

In exactly the same manner, message signals including code characters of the five-unit telegraph code originating at the telegraph transmitting device 314 are fed on demand to the transmitter unit 301 over a circuit including the telegraph storage device 307, switch 306 and channel 305. The transmitter unit 301 operates to forward the corresponding seven-unit code characters to the receiver unit 202. The receiver unit 202 functions to convert the seven-unit code characters received to the corresponding code characters of the five-unit telegraph code. If the code characters are correctly received, they are fed to the telegraph printing device 212 over the circuit including channel 210 and switch 211.

Two separate and independently operated transmission paths are available for forwarding message signals in the different directions between the central stations 1, 2. With the exception of the automatic code character correction system described above, the respective transmission paths can be operated to carry uninterrupted one-way or non-conversational message signals between the central stations 1, 2. As the operation of one of the transmission paths is not dependent upon the operation of the other, the respective transmission paths can be operated simultaneously, alternately or in any manner desired.

A subscriber station 215 connected to the central station 1 may wish to converse with the subscriber station 315 connected to the central station 2 using teleprinters or similar telegraph equipment. In this situation, it is necessary to make the transmission paths normally assigned to handle non-conversational or one-way traffic between the central stations 1, 2 available to handle the conversational or two-way traffic to be forwarded between the subscriber stations 215, 315. The switching-control circuit 213 at the central station 1 and the switching-control circuit 313 at the central station 2 are provided in association with other equipment to be described to automatically perform this action.

The subscriber station 215, upon desiring to complete a call to the subscriber station 315, operates a selector 217 over a circuit including a coupling circuit 218 to complete a connection through the selector 217 to the switching-control circuit 213. The switching-control circuit 213 thereupon causes an alarm or light to be operated at an operator's position 216 located at the central station, alerting the operator to the incoming call. The operator's position 216 in addition to being arranged for connection to the switching-control circuit 213 may be arranged to be connected to one of a number of other similar circuits included in communication systems similar to that shown in Figure 1. The operator operates the proper channel and local switches or keys at the position 216 to connect a teletypewriter or similar device over lead 225 and through the switching-control circuit 213, selector 217 and coupling circuit 218 to the subscriber station 215 and is ready to receive the call.

Immediately upon the connection being completed from the subscriber station 215 to the switching-control circuit 213, the switching-control circuit 213 functions to apply a control signal to the input switching circuit 204 over lead 219 and to the transmitter unit 201 over lead 220. The transmitter unit 201 is made to interrupt the transmission of the code characters supplied by the storage device 207 by not applying control pulses thereto and instead transmits the seven-unit code character Beta mentioned above. This action causes the switch 206 to be switched into its opposite condition in which the storage device 208 is connected to the transmitter unit 201 over channel 205. The receiver unit 302 detects the code character Beta and causes a control signal to be applied to the output switching circuit 309 over lead 321 and to the switching-control circuit 313 over lead 322. The switch 311 is made by this action to assume its opposite condition in which a connection is completed from the receiver unit 302 to the switching-control circuit 313 over channel 310. The transmission of one-way traffic over the transmission path including transmitter unit 201 and receiver unit 302 is, therefore, interrupted.

Upon the reception of the control signal, the switching-control circuit 313 causes a hunting switch 323 to operate so as to complete a connection between the switching-control circuit 313 and an available impulse converter 324. The impulse converter 324 includes an answer-back equipment known in the art which is placed in operation immediately upon the connection being completed by the hunting switch 323 between the impulse converter 324 and the switching-control circuit 313. An identifying signal including one or more five-unit code characters is fed from the impulse converter 324 to the storage device 308 over the circuit including the switching-control circuit 313 and lead 326. The storage device 308 stores the identifying signals, pending the transmission thereof by the transmitter unit 301. In addition to the above actions, the switching-control circuit 313 functions to block the possible completion of a connection between the switching-control circuit 313 and the selector 317. By this action, the subscriber station 315 or another subscriber station connected to the selector 317 is prevented from completing a connection to the switching-control circuit 313 during the period in which the connection is completed between the subscriber stations 215 and 315, avoiding the confusion which might otherwise occur.

The output switching circuit 309, switching-control circuit 313, storage device 308 and input switching circuit 304 at the central station 2 are interconnected in such a manner that the switch 311 and the switch 306 can not both be switched into their opposite operating conditions at the same time. At least one of the switches 311 or 306 must be at all times in the normal operating condition thereof to permit the transmission of one-way message signals over the transmission path of which it is a part. In much the same manner, the input switching circuit 204, storage device 208, switching-control circuit 213 and output switching circuit 209 are interconnected such that at least one of the switches 206 or 211 is at all times in its normal operating condition to permit the transmission of one-way message signals over the transmission path of which it is a part. Since the switches 204, 311 are at this time in their opposite conditions, having interrupted the passage of one-way message signals between the transmitting device 214 and the printing device 312, the switches 306, 211 cannot be switched so as to permit the transmission of the identifying signal stored in the storage device 308.

At this time, the operator at the central station 1, having determined the nature of the call desired by the subscriber station 215, operates a remote switch or key at the operator's position 216. A control signal is fed from the switching-control circuit 213 to the input switching circuit 204 over lead 219 and to the transmitter unit 201 over lead 220. This action causes the switch 206 to return to its normal operating condition and the transmitter unit 201 to transmit the seven-unit code character Alpha. The reception of the code character Alpha at the receiver unit 302 causes a control signal to be fed from the receiver unit 302 to the output switching circuit 309 over lead 321 and to the switching-control circuit 313 over lead 322. Switch 311 is made to assume its normal operating condition. The transmission of one-way message signals between the transmitting device 214 and the printing device 312 then proceeds in the regular manner.

As soon as the switch 311 returns to its normal operating condition and the control signal is received by the switching-control circuit 313, the interaction of the switching-control circuit 313 and the storage device 308 is such that the storage device 308 is released. The storage device 308 is designed such that when it is released and there is information stored therein a control signal is fed from the storage device 308 to the input switching circuit 304 over a lead 327 and to the transmitter unit 301 over lead 320. Since switch 311 is now in its normal operating condition, switch 306 can be and is made to assume its opposite operating condition in which the storage device 308 is connected to the transmitter unit 301 over channel 305. The transmitter unit 301 operates in response to the control signal to withhold control pulses from storage device 307 and functions to transmit the seven-unit code character Beta. The reception of the code character Beta by the receiver unit 202 causes a control signal to be fed to the output switching circuit 209 over lead 221 and to the switching-control circuit 213 over lead 222. Switch 211 is made to switch into the opposite operating condition. By the above actions, the transmission of one-way message signals between the transmitting device 314 and the printing device 212 is interrupted.

Immediately after the transmission of the code character Beta by the transmitter unit 301 and the operation of the switches 211 and 306, the storage unit 308 proceeds to forward the identifying signal stored therein to the transmitter unit 301 over lead 329 and channel 305. The identifying signal is received at the receiver unit 202 and is fed to the teletypewriter device at the operator's position 216 over the circuit including channel 210, switch 211, lead 228, switching-control circuit 213 and lead 225.

The storage device 308 is designed such that upon all of the information stored therein being fed to the transmitter unit 301, a control signal is fed from the storage device 308 to the input switching circuit 304 over lead 327 and to the transmitter unit 301. This action causes switch 306 to return to its normal operating condition and the transmitter unit 301 to transmit the code character Alpha. Upon the reception of the code character Alpha at the receiver unit 202, a control signal is fed from the receiver unit 202 to the output switching circuit 209 over lead 221 and to the switching-control circuit 213 over lead 222. Switch 211 is made to assume its normal operating condition. The transmission of one-way message signals between transmitting device 314 and printing device 212 is resumed.

The reception of the identifying signal plus the code character Alpha at the operator's position 216 provides an indication to the operator that the necessary connection has been completed to the central station 2 and that he can proceed with the transmission of the calling number of the subscriber station 315. The operator at the operator's position 216 will have determined from the subscriber station 215 the fact that a call is to be completed to the subscriber station 315. The operator operates the teletypewriter or sending device at the operator's position 216 to cause the calling number of the subscriber station 315 including an arrangement of code characters to be fed to the storage device 208 over the circuit including lead 225, switching-control circuit 213 and lead 226. Upon the calling number being stored in the storage device 208, the storage device 208 causes a control signal to be fed to the input switching circuit 204 over lead 227 and to the transmitter unit 201 over lead 220. Switch 206 is switched into its opposite operating condition, and the transmitter unit 201 proceeds to transmit the code character Beta. It should be noted that this action can occur since switch 211 is at this time in its normal or rest operating condition.

The reception of the code character Beta causes a control signal to be fed from the receiver unit 302 to the output switching circuit 309 over lead 321 and to the switching-control circuit 313 over lead 322. Since switch 306 is at this time in its normal operating condition, switch 311 can be and is made to assume its opposite operating condition. The transmission of the one-way message signals between the transmitting device 214 and the printing device 312 is interrupted. The calling number stored in the storage device 208 is fed from the storage device 208 to the impulse converter 324 over the circuit including lead 229, switch 206, channel 205, transmitter unit 201, receiver unit 302, channel 310, switch 311, lead 328, switching-control circuit 313 and hunting switch 323. When the calling number has been completely fed out of the storage device 208, a control signal is automatically fed from the storage device 208 to the input switching circuit 204 over lead 227 and to the transmitter unit 201 over lead 220. Switch 206 returns to its normal operating condition and transmitter unit 201 proceeds to transmit the code character Alpha. As a result, a control signal is fed from the receiver unit 302 to the output switching circuit 309 over lead 321 and to the switching-control circuit 313 over lead 322. Switch 311 is returned to its normal operating condition. The transmission of one-way message signals between the transmitting device 214 and the printing device 312 is resumed.

The impulse converter 324 includes equipment responsive to the calling number received to apply a group of control pulses to a selector 330 over a lead 331 such that the selector 330 is made to complete a connection between the switching-control circuit 313 and the subscriber station 315 through the coupling circuit 318. When the connection is completed, the switching-control circuit 313 causes the impulse converter 324 to forward date and time information in the form of a series of code characters to the subscriber station 315 over the circuit including a lead 332 and the selector 330. In addition, the time and date information is fed through the switching-control circuit 313 to the storage device 308 over leads 332, 326. Since switches 206, 311 are now in their normal operating conditions, the storage device 308 can and does function in the manner described to bring about the switching of switches 211, 306 into their opposite conditions. The transmission of one-way message signals between the transmitting device 314 and the printing device 212 is interrupted.

While the above circuit operations are occurring, the operator at the operator's position 216 operates a monitor switch or key which causes the subscriber station 215 to be connected to the storage device 208 over the circuit including switching-control circuit 213 and lead 226. At the same time, the subscriber station 215 is connected to the output switching circuit 209 over the circuit including the switching-control circuit 213 and lead 228. The operator by the operation of the monitor key can in effect achieve the simultaneous manipulation of the local and remote keys provided at the operator's position 216, and the teletypewriter provided at the operator's position 216 as a monitoring device can be inserted in the connection completed between the subscriber station 215 and the subscribed station 315.

At the time that the connection is completed between the switching-control circuit 313 and the subscriber station 315, answer-back equipment located at the subscriber station 315 is operated to forward an identifying signal including one or more code characters to the storage device 308 through the switching-control circuit 313. Since the storage circuit 308 has taken control of the channel included in the multiplex signal transmitted by the transmitter unit 301 to the receiver unit 202, the time and date information supplied by the impulse converter 324 and the identifying signal supplied by the subscriber station 315 are forwarded from the storage device 308 over the channel to the receiver unit 202. The time and date information, as well as the identifying signal, are fed from the receiver unit 202 to the subscriber station 215. If the teletypewriter located at the operator's position 216 is included in the connection, the time and date information and the identifying signal will be received thereby. When all of the information stored in the storage device 308 has been transmitted, the code character alpha is transmitted by the transmitter unit 301 and switches 211, 306 return to their normal operating conditions. The transmission of one-way message signals between transmitting device 314 and printing device 212 is resumed.

When the subscriber station 215 receives the identifying signal of the subscriber station 315, the subscriber station 215 may proceed to transmit its own identifying signal which is by the action of the storage device 208 in the manner described, forwarded over the transmission path including transmitter unit 201 and receiver unit 302 to the subscriber station 315. The identifying signal supplied by the subscriber station 215 is also received on the teletypewriter at the operator's position 216, and the operator may start a suitable counter or time determining device in operation to record the charges to be made for the time used to complete the call. A connection or two-way transmission system is at this time completed between the subscriber stations 215, 315. A message signal originating at the subscriber station 215 is first fed to the storage device 208. The storage device 208 takes control of the channel 205 such that the transmission of one-way message signals between the transmitting device 214 and the printing device 312 is interrupted. The message signal originating at the subscriber station 215 is transmitted over the channel 205 and is fed through the receiver unit 302, output switching circuit 309 and switching-control circuit 313 at the central station 2 to the subscriber station 315. In a similar manner, a message signal originating at the subscriber station 315 is, by the action of the storage device 308, transmitted over the transmission path including the transmitter unit 301 and receiver unit 202 to the subscriber station 215, the normal transmission of one-way message signals over the transmission path being interrupted.

A feature of the invention is the fact that only the transmission path actually required is assigned at any given time to handle the conversational traffic between the subscriber stations 215, 315. Both transmission paths are normally arranged to carry one-way message signals between the central stations 1, 2. A transmission path is made available for the transmission of two-way message signals only for the duration of a message signal actually in the process of being transmitted by one of the subscriber stations 215 or 315 in the direction of the transmission path. By the use of the invention, one transmission path is not maintained in an idle condition while the second transmission path is in use such as occurs in known communication systems. A more efficient use of the available transmission paths is obtained. A further feature of the invention is the fact that the switching functions necessary to complete the connection between the subscriber stations 215, 315 are performed automatically. The use of complicated and confusing procedures to coordinate the operation of manual connecting means at the central stations 1, 2 is avoided.

When the conversation between the subscriber stations 215, 315 is completed, the calling subscriber station 215 breaks the connection between the subscriber station 215 and the switching-control circuit 213. As soon as the last code character stored in the storage device 208 has been transmitted, a releasing signal is fed from the switching-control circuit 213 to the transmitter unit 201. The transmission of one-way message signals between the transmitting device 214 and the printing device 312 is blocked. The transmitter unit 201 proceeds instead to transmit alternately the code characters Alpha and Beta. The reception of the code characters Alpha and Beta by the receiver unit 302 causes a releasing signal to be fed to the switching-control circuit 313. The switches 206, 311 are, thereafter, made to assume their normal operating conditions and regular one-way message signals are forwarded between the transmitting device 214 and the printing device 312 over the transmission path including the transmitter unit 201 and the receiver unit 302.

The switching-control circuit 313 functions in response to the releasing signal to break the connection between the switching-control circuit 313 and the subscriber station 315. The transmitter unit 301 is controlled to alternately transmit the code characters alpha and beta, regardless of whether or not code characters are stored in the storage device 308. The switching-control circuit 213 is designed to cause the transmitter unit 201 to continue to send the code characters Alpha and Beta alternately until a signal is received thereat resulting from the reception by the receiver unit 202 of the code characters Alpha and Beta, indicating that the releasing signal has been received by the switching-control circuit 313. Any code characters stored in the storage device 308 at this time are fed out of the storage device 308 and lost. Since the connection to the subscriber station 215 is broken, the code characters stored in the storage device 308 can not be received thereby. The transmission of the code characters is therefore suppressed. The switches 211, 306, thereafter, assume their normal operating conditions and one-way message signals are forwarded between the transmitting device 314 and the printing device 212 over the transmission path including transmitter unit 301 and receiver unit 202. The communication system is returned to its original operating condition. While the description has been given in connection with the completion of a call from the subscriber station 215 to the subscriber station 315, the circuit operations are the same should a call be made in the opposite direction.

Basically, three manual switching operations are performed at the operator's position 216 in completing a call between the subscriber station 215 and the subscriber station 315. A local key is provided for completing a connection between the teletypewriter at the operator's position 216 and the subscriber station 215. A remote key is provided for establishing a connection between the teletypewriter at the operator's position 216 and the storage device 208. A disconnect key is provided for breaking either the local or remote connection. If the disconnect key is operated when the local key is in position, the connection to the subscriber station 215 is broken. On the other hand, if the disconnect key is operated when the remote key is in position, the connection to the subscriber station 315 over the transmission path including the transmitter unit 201 and receiver unit 302 is broken. A monitor key may be provided at the operator's position 216 which achieves the results otherwise obtainable by the simultaneous operation of the remote and local key, whereby the teletypewriter located at the operator's position 216 is included in the connection completed between the subscriber stations 215, 315 for monitoring purposes. The operator's position 316 which is similar in construction and operation to the operator's position 216 will also include the local, remote, disconnect and monitor keys for operation in completing a call originating at the subscriber station 315.

If the teletypewriter at the operator's position 216, for example, is designed for printing different colors such as red and black, equipment may be provided at the operator's position 216 responsive to the reception of the code character Beta over the circuit including the output switching circuit 209 and switching-control circuit 213. The teletypewriter at the operator's position 216 may be operated to print the message signals originating at the subscriber station 215 in black and the message signals originating at the subscriber station 315 in red.

The code characters Alpha and Beta transmitted by the transmitter units 201 and 301 which are used to perform various control functions according to the invention, are preferably repeated several times, for example, five times upon the transmission thereof by one of the transmitter units 201, 301. By this action, a particular control function is completed even though one of the code characters may be omitted or lost during the transmission thereof due to interference, and so on.

A physical view of the operator's positions 216, 316 is shown by way of example in Figure 2. For the sake of description, it will be assumed that the operator's position shown in Figure 2 corresponds to the operator's position 216 in Figure 1. The operator's position 316, however, will be of the same general appearance and operation. The operator's position 216 may be connected to a number of switching-control circuits 213. A call lamp 401 is provided for each connection from the operator's position 216 to one of the switching-control circuits 213. A channel key 402 is provided beneath each lamp 401 and functions when operated to connect the operator's position 216 to the switching-control circuit 213 corresponding to the lamp 401 with which the key 402 is associated. Five control keys 403 through 407 are provided in common with the keys 402. The key 403 is the local key by which the teletypewriter at the operator's position 216 can be connected to subscriber station 215. The key 404 is the remote key by which the teletypewriter at the operator's position 216 can be connected to the storage device 208. The key 405 is the monitor key by which a connection can be completed between the subscriber stations 315, 215 and by which the teletypewriter at the operator's position 216 may be included in the connection so as to monitor the two-way or conversational message signals. A connect key 406 is provided for disconnecting the teletypewriter at the operator's position 216 from the connection completed between subscriber stations 215, 315. A key 407 is designated as the disconnect key. If the disconnect key 407 is operated when the local key 403 is in position, the connection between the operator's position 216 and the subscriber station 215 is broken. If the disconnect key 407 is operated when the remote key 404 is in position, the connection between the operator's position 216 and the central station 2 or subscriber station 315 is broken. Finally, if the disconnect key 407 is operated when the monitor key 405 is in position, the connection between the operator's position 216 and the subscriber station 215, as well as the connection between the operator's position 216 and the central station 2, are broken.

A counter 408 is provided by which a visible indication of the time required to complete a call between the subscriber stations 215, 315 is given. A key 409 is provided to connect the counter 408, while a key 410 is provided to disconnect the counter 408. The counter 408 will be included in the connection completed according to the particular one of the keys 402 placed in operating position. By the use of the counter 408, charges to be made for the use of connections supervised by the central station 1 can be readily determined. A row of additional keys 411 are provided and may be adapted to bring about various control functions such as the automatic transmission of busy signals, termination signals, and so on. A dialing device 412 is provided by which the operator can cause the automatic transmission of calling numbers and routing information in completing a call between the subscriber stations 215, 315.

What is claimed is:

1. A communication system comprising, in combination, first and second stations having telegraph printer apparatus coupled thereto, a first transmission path arranged normally to carry signals in one direction between the printer apparatus at said first and second stations, a second transmission path arranged normally to carry signals in the opposite direction between the printer apparatus at said first and second stations, a third station connected to said first station, a fourth station connected to said second station, switching means located at said first station and at said second station for selectively completing a connection over either said first or second transmission paths between said third and said fourth stations, said switching means functioning to interrupt the transmission of signals between the printer apparatus at said first and second stations over the selected transmission path adapted to carry signals between said third and said fourth stations, and means located at said first and at said second stations for conditioning said switching means to connect only one of said transmission paths at any one time to carry signals between said third and said fourth stations during which time the other transmission path is maintained in normal condition to carry signals between the printer apparatus at said first and second stations.

2. A communication system comprising, in combination, first and second stations having printer apparatus thereat, a first transmission path arranged normally to carry signals in one direction between the printer apparatus at said first and second stations, a second transmission path arranged normally to carry signals in the opposite direction between the printer apparatus at said first and second stations, a third station connected to said first station, a fourth station connected to said second station, switching means located at said first station and at said second station for selectively completing a connection over either said first or second transmission paths between said third and said fourth stations depending upon the direction of transmission, said switching means functioning to interrupt the transmission of signals between the printer apparatus at said first and second stations over the selected transmission path adapted to carry signals between said third and fourth stations, and means located at said first and at said second stations for conditioning said switching means to connect only one of said transmission paths at any one time according to the direction of transmission to carry signals between said third and fourth stations during which time the other transmission path is maintained in normal condition to carry signals between the printer apparatus at said first and second stations.

3. A communication system as claimed in claim 2 and wherein said switching means are automatically operated under the control of said last-mentioned means in response to predetermined code characters forwarded over said transmission paths, said switching means being operated in response to one of said code characters forwarded over a given one of said transmission paths to enable the transmission of signals between the printer apparatus at said first and second stations over said given one of said transmission paths, said switching means being operated in response to a second one of said code characters forwarded over said given one of said transmission paths to enable the transmission of signals between said third and fourth stations over said given one of said transmission paths.

4. A communication system comprising, in combination, first and second stations having printer apparatus thereat, a first transmission path arranged normally to carry nonconversational message signals in one direction between the printer apparatus at said first and second stations, a second transmission path arranged normally to carry nonconversational message signals in the opposite direction between the printer apparatus at said first and second stations, a third station connected to said first station, a fourth station connected to said second station, switching means located at said first station and at said second station for selectively completing a connection over either said first or second transmission paths to carry conversational mesage signals between said third and said fourth stations according to the direction of said conversational message signals, said switching means functioning to interrupt the transmission of said nonconversational message signals between the printer apparatus at said first and second stations over the selected transmission path adapted to carry said conversational message signals between said third and said fourth stations, and means located at said first and at said second stations for conditioning said switching means to connect only one of said transmission paths at any one time according to the direction of said conversational message signals to carry said conversational mesasge signals between said third and fourth stations during which time the other transmission path is maintained in normal condition to carry said nonconversational message signals between the printer apparatus at said first first and second stations.

5. A communication system comprising, in combination, first and second stations having printer apparatus thereat, a first transmission path arranged normally to carry signals in one direction between the printer apparatus at said first and second stations, a second transmission path arranged normally to carry signals in the opposite direction between the printer apparatus at said first and second stations, a third station connected to said first station, a fourth station connected to said second station, switching means located at said first station and at said second station for selectively completing a connection over either said first or second transmission paths between said third and said fourth stations, said switching means functioning to interrupt the transmission of signals between the printer apparatus at said first and second stations over the selected transmission path adapted to carry signals between said third and fourth stations, control means located at said first and at said second stations for conditioning said switching means to connect only one of said transmission paths at any one time according to the direction of transmission to carry signals between said third and said fourth stations during which time the other transmission path is maintained in normal condition to carry signals between the printer apparatus at said first and second stations, and means for automatically operating said switching means to return a transmission path connected to carry signals between said third and fourth stations upon the completion of the transmission of said last-mentioned signals to the normal condition thereof to carry signals between the printer apparatus at said first and second stations.

6. A communication system comprising, in combination, first and second stations having printer apparatus thereat, a first transmission path arranged normally to carry nonconversational message signals in one direction between the printer apparatus at said first and second stations, a second transmission path arranged normally to carry nonconversational message signals in the opposite direction between the printer apparatus at said first and second stations, a third station connected to said first station, a fourth station connected to said second station, switching means located at said first station and at said second station for selectively completing a connection over either said first or second transmission paths to carry conversational message signals between said third and said fourth stations, said switching means functioning to interrupt the transmission of said nonconversational message signals between the printer apparatus at said first and second stations over the selected transmission path adapted to carry said conversational massage signals between said third and said fourth stations, control means located at said first and at said second stations for conditioning said switching means to connect only one of said transmission paths at any one time according to the direction of said conversational message signals to carry said conversational message signals between said third and said fourth stations during which time the other transmission path is maintained in normal condition to carry said nonconversational message signals between said first and second stations, and means for automatically operating said switching means to return a transmission path adapted to carry said conversational signals between said third and fourth stations upon the completion of the transmission of said last-mentioned conversational signals to the normal condition thereof to carry said nonconversational message signals between the printer apparatus at said first and second stations.

7. A communication system as claimed in claim 6 and wherein said switching means are automatically operated under the control of said control means in response to predetermined code characters forwarded over said transmission paths, said switching means being operated in response to one of said code characters forwarded over a given one of said transmission paths to enable the transmission of said nonconversational message signals between the printer apparatus at said first and said second stations over said given one of said transmission paths, said switching means being operated in response to a second one of said code characters forwarded over said given one of said transmission paths to enable the transmission of conversational message signals between said third and fourth stations over said given one of said transmission paths.

References Cited in the file of this patent

UNITED STATES PATENTS

| | | |
|---|---|---|
| 2,766,318 | Bacon | Oct. 9, 1956 |
| 2,828,362 | Darwin | Mar. 25, 1958 |